United States Patent [19]
Zanoni et al.

[11] Patent Number: 5,224,197
[45] Date of Patent: Jun. 29, 1993

[54] INTEGRATED OPTICS USING PHOTODARKENED POLYSTYRENE

[75] Inventors: Raymond Zanoni; Qian Gong, both of Tucson, Ariz.

[73] Assignee: The United States of America as represented by the Secretary of the Air Force, Washington, D.C.

[21] Appl. No.: 830,035

[22] Filed: Jan. 31, 1992

Related U.S. Application Data

[62] Division of Ser. No. 580,405, Sep. 6, 1990.

[51] Int. Cl.$^5$ .............................................. G02B 6/10
[52] U.S. Cl. ..................... 385/130; 385/129; 385/132; 430/332
[58] Field of Search ............... 385/129, 130, 132, 143, 385/145; 430/339, 332, 290

[56] References Cited
FOREIGN PATENT DOCUMENTS
0779239 2/1967 Canada .

OTHER PUBLICATIONS
Optical Waveguide Components in Organic Photochromic Materials, Bennion et al., Radio & E. Engineer, V53 #9, pp. 313–320, Sep. 1983.

Primary Examiner—John D. Lee
Assistant Examiner—S. Barns
Attorney, Agent, or Firm—Thomas C. Stover; Donald J. Singer

[57] ABSTRACT

Integrated optical devices are provided wherein a film of polystyrene doped with methyl red (PS-MR) on a glass substrate, is masked, e.g. with one or more metallic strips on a glass plate and such film is irradiated with, e.g. a UV lamp, tuned within the absorption band of such film, in air, to photobleach the film portions around channels covered by the masking strips and reduce the refractive index thereof below that of the unbleached film channels. The bleached film portions then provide reflective beam confining interfaces which define the unbleached channels and form waveguides within the film. The invention takes advantage of photobleaching to change the index of refraction of portions of a thin film to define optical components therein and has located a class of films, including PS-MR, which, upon photobleaching, provide a considerable reduction in refractive index, enabling the definition of optical components in such film. The invention includes the methods of fabricating such integrated optics as well as the integrated optic products so-made.

14 Claims, 3 Drawing Sheets

INTEGRATED OPTICS USING PHOTODARKENED POLYSTYRENE

The invention described herein may be manufactured and used by or for the Government for governmental purposes without the payment of any royalty thereon.

This application is a division of application Ser. No. 07/580,405, filed Sep. 6, 1990.

BACKGROUND OF THE INVENTION

1. Field of the Invention

This invention relates to fabricating integrated optics, including optics in polymer films, particularly films of polystyrene doped with an azo dye.

2. The Prior Art

Integrated optical circuits include optic components in a film, e.g., waveguides, optical interconnects, phase gratings and the like, which direct (or reflect) light beams in a desired direction. These components have been made in the past by a) ion exchange, a multi-step process wherein ions are exchanged in a glass substrate or b) ion milling, another multi-step process which requires a vacuum and an ion gun, both processes being relatively complex and cumbersome.

In the photobleaching prior art, U.S. Pat. No. 4,677,049 to Gritting (1987), teaches interposing a photobleachable layer between a mask and a photo-resist layer and irradiating the layers through the mask. The exposed parts of the photobleachable layer bleach to form an in-situ mask on the photo-resist layer and enhances the contrast of the mask image on such photo resist layer. Such enhanced mask images on the photo resist layer are used for photolithography in the manufacture of integrated electric circuits. Also see German Patent DE 3346716 A1 to Wegner et al. which appears to disclose the bleaching of polydiacetlylenes into photo-resist layers to make masks therein.

Also U.S. Pat. No. 4,808,285 to Chen et al. (1989) discloses the making of Y-couplers and gratings in polydiacetylene film by exposing same to a scanning electron beam or e-beam, which changes the index of refraction in such film to a certain depth. This is a cumbersome process which takes time and in which, variation in the scanning rate and/or beam intensity will vary the depth of penetration into such film. Further the scanning beam can define ragged diagonal edges in the Y-coupler 100 of FIG. 2, resulting in beam leakage thereat. Additional beam leakage can occur in the unirradiated core 310 below the Y-coupler pattern 400, as indicated in such FIG. 2.

U.S. Pat. No. 4,270,130 to Houle et al. discloses the use of dyes in a record disk that is grooved by a laser beam that forms a deformation pattern therein, such dyes being deformed by ablation during groove formation so as to render it transparent to such recording laser beam. Such beam can now be used, (even at an increased power level) for playback from such recording without destroying the recorded deformation pattern.

The prior art discloses various uses of an azo dye, e.g. methyl red, in other fields. For example, U.S. Pat. No. 4,124,390 to Kohn (1978), discloses the use of methyl red for dye toning of black and white, photographic silver images. U.S. Pat. No. 4,818,660 to Blanchet-Fincher et al (1989), discloses the use of methyl red in a photo-hardenable master, for rendering faithful proofs in the graphic arts. U.S. Pat. No. 4,360,606 to Tobias et al. (1982), discloses photo-degradeable polymer compositions based on, e.g. polystyrene, which also includes an organic photosensitizer, such as methyl red.

Accordingly, the above prior art makes no suggestion of employing an uncomplex process for forming clearly defined components for integrated optics. However, there is need and market for a process that can fabricate integrated optics including structures, circuits and components thereof, that is streamlined rather than complex and otherwise overcomes the above prior art shortcomings.

There has now been discovered a simplified (and reduced temperature) process for fabricating the above optics by locating a suitable polymer and then selectively changing the index of refraction thereof to obtain such optics.

SUMMARY OF THE INVENTION

Broadly the present invention provides an integrated optic comprising a film of PS-AD on a substrate, which film has a photobleached portion and a lesser or unbleached part, adjacent said portion, said portion having a lesser index of refraction than said part to provide a reflective interface or boundary therewith and to define an optical component in said part.

By films of "PS-AD", as used herein, is meant films of polystyrene doped with an azo dye.

By an "azo dye" as used herein, is meant, methyl red, methyl orange, methyl violet, methyl yellow and similar azo dyes.

By films of "PS-MR", as used herein, is meant, films of polystyrene doped with methyl red.

By "methyl red" as used herein, is meant, eg. 2-[4-(dimethylamino)phenylazo]benzoic acid By "lesser or unbleached (film) part", as used herein, is meant a film part that is, e.g. under the edges of a mask and is less bleached than irradiated film beyond the outlines of the mask but may be more bleached than unbleached film including film well under such mask.

BRIEF DESCRIPTION OF THE DRAWINGS

The invention will become more apparent from the following detailed specification and drawings in which.

DESCRIPTION OF PREFERRED EMBODIMENTS

Figure 1:
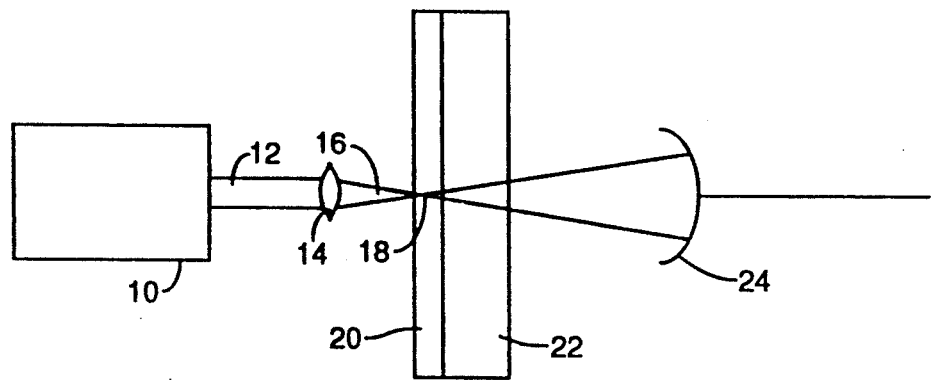
FIG. 1 is a schematic sectional elevational view of a method embodying the present invention.

Referring in more detail to the drawings, argon laser 10 directs a laser beam 12 through a focusing lens 14, which focuses a beam 16 onto a spot 18 of a polymer film 20 mounted on a glass substrate 22. The film is irradiated a sufficient time to photobleach it, e.g. after several minutes of irradiation, the laser beam bleaches the film and increasingly passes therethrough and is received by a detector 24, as shown in FIG. 1.

For purposes of the method of the present invention, it has been determined that a certain type of polymer film lends itself to the formation of integrated optics by the above photobleaching process. It has been found that films of PS-AD are suitable, of which PS-MR is highly suitable. That is, it has been found that thin film samples of PS-MR become transparent or bleach when irradiated with light tuned to the absorption band of the sample. In addition the concomitant reduction in the refractive index thereof is appreciable, as discussed below.

A suitable light is UV light which is broad-banded and can include wavelengths, $\lambda$, of 200 nm up to 440 nm or more, including $\lambda = 405$ nm.

A preferred composition range of PS-AD in such films, is 20 to 30 wt.% of an azo dye mixed with 80 to 70 wt.% of polystyrene. Relative to the graph of FIG. 5, 28.5 wt.% of methyl red mixed with 71.5 wt.% of polystyrene, was employed in a film about 1 um thick.

The method of the present invention takes advantage of at least two scientific principles. That is, 1) according to the invention, a selected thin film is photobleached to reduce the index of refraction in a portion thereof and 2) the so-reduced portion or portions of the film, provide reflective boundaries or interfaces with the unbleached part or parts of the film so as to define said parts as optical components, including waveguides and gratings which are integral with such film. Such film can be photobleached in a pattern e.g. with portions bleached on both sides of an unbleached part, to define a channel or waveguide in such part. Other optical components including phase gratings, can be formed in such film, as more fully described below.

By "thin film(s)", as used herein, is meant films that are from 0.2 to 5.0 um thick, with a preferred range of 0.5 to 1.5 um, including about 1 um thick.

Figure 4:
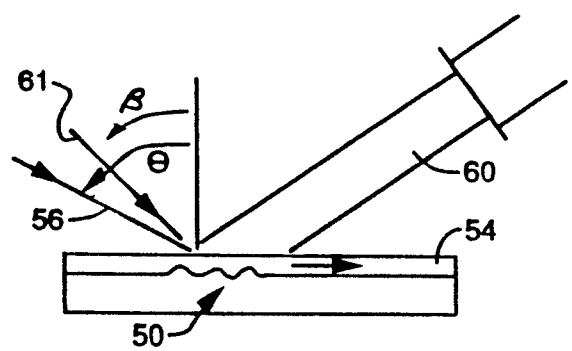

Here it is noted that the arrangement shown in FIGS. 1 and 4, is suited for examining the change of physical properties in such film, before and after photobleaching, of which, absorption changes are measured and shown in the graph of FIG. 5, as more fully discussed below.

Figure 2:
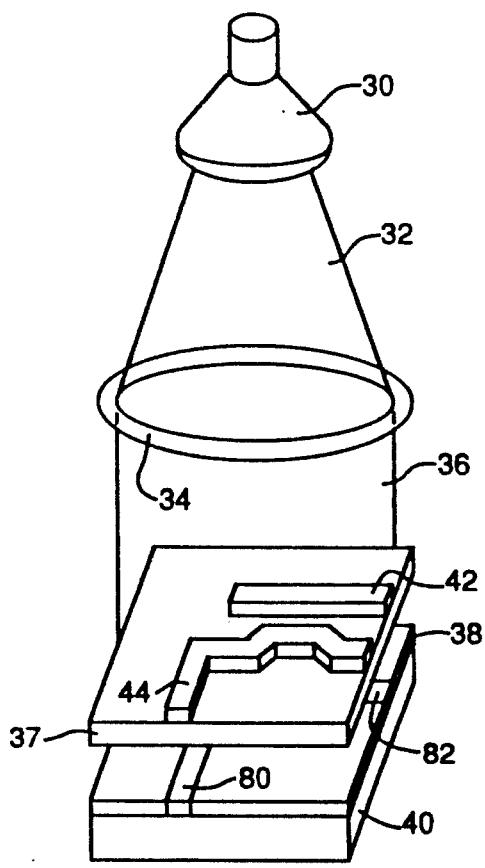
FIG. 2 is a perspective view of another photobleaching method embodying the present invention.

In an another embodiment of the present invention, UV lamp 30 directs a beam 32 through a collimating lens 34, forming a collimated beam 36, which irradiates a PS-MR film 38, mounted on a glass substrate 40, which film is mounted below two optical channel-defining metal masks 42 and 44 on a glass plate 37, as shown in FIG. 2. Here, after sufficient irradiation, the film 38 is photobleached on both sides of the masking elements 42 and 44 reducing the index of refraction of the film, $n_f$, and providing reflective interfaces for the unbleached film parts under the masking strips 42 and 44. These unbleached parts now have a higher index of refraction than the bleached film portions and thus define optical channels 80 and 82, as shown in the integrated film circuit 78 of FIG. 8. Such film circuit 78 is more fully discussed below.

Figure 3:
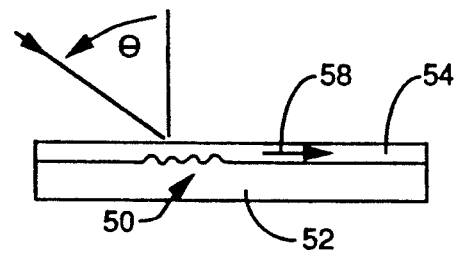
FIGS. 3 and 4 are schematic sectional elevation views of a method embodying the present invention.

A light beam can enter a waveguide in a film through the film edge as discussed below with respect to FIG. 8. A light beam can also enter a waveguide in a film, coming in at an angle with the surface of such film, provided a coupling means or grating is provided in such film. In the prior art grating couplers have been formed by, e.g. ion milling of ridges and grooves either into the surface of the film above a channel or the surface of such film or substrate below a channel, which grating can couple a major portion of an incoming incident beam into the film channel, the rest of the beam being reflected or transmitted as is known in the prior art. Thus a grating 50 of ridges and grooves, having been milled into a glass substrate 52, is covered with a PS-MR film 54, as shown in FIG. 3. Such ridged and grooved phase grating is known as a surface relief grating. When a beam 56 of a suitable wavelength, e.g. $\lambda = 700$ nm, per the graph of FIG. 5, more fully discussed below, is directed at the grating 50 at a suitable incident angle $\theta$, most of the beam will be coupled into a waveguide 58 of the film, the remainder of the beam being reflected, absorbed or transmitted as noted above.

When the film above the grating 50 is irradiated by a light beam 60 (per FIG. 4), tuned to the absorption band of such polymer film, that film portion is photobleached (and made more transparent), which induces a reduction in the refractive index of the PS-MR film.

This drop in refractive index can be measured since the incident angle at which the above light beam 56 will couple into the waveguide of the film 54, is now reduced to angle $\beta$ with the incoming beam moved to the position of arrow 61, as shown in FIG. 4.

Thus the refractive index of the film is reduced with increasing exposure to irradiation, as shown in FIG. 4 and the coupling incident angle of the incoming beam to the grating 50, is accordingly reduced.

As noted above, photobleaching of PS-MR films by the method of the present invention, renders film that was opaque to light at certain wavelengths, increasingly transparent, that is, the absorbance of such wavelength is decreased by irradiation of such film by light tuned within the absorption band thereof. Such change in absorbance is shown in the graph of FIG. 5 wherein absorbance on the ordinate is plotted against wavelength on the abscissa and curve 64 is the absorbance of such film before irradiation and curve 66 is the absorbance of such film after photobleaching. It can be seen from the curve of 64 that such film is absorbant to light at wavelengths of about 400 to 600 nm, i.e. is opaque to such wavelengths. Accordingly such wavelengths cannot be transmitted in the unbleached channels or waveguides of the film employed in the present invention since they would be absorbed, as indicated in FIG. 5. However, light of wavelengths of 600 nm and above, can be transmitted in the (unbleached) film waveguides of the invention since the unbleached film is transparent thereto. However, the remainder of the film, e.g. film 71 of FIG. 8, is bleached on both sides of the respective waveguides 80 and 82, to provide, as noted above, reflective interfaces or boundaries of lower indices of refraction to keep the transmitted light in the respective waveguide 80 or 82.

Returning now to FIG. 4, when the film 54, above the grating 50 is irradiated by laser beam 60 at, e.g. 514.5 nm to photobleach such film, the index of refraction thereof is progressively lowered for all wavelengths, including those above 600 nm. Thus the incoming light beam incident angle at a coupling grating, per FIG. 4, will be reduced for all wavelengths as said grating is photobleached per the method of the present invention. Accordingly progressive measurements of the reduction of incident angle of a selected wavelength, e.g. $\lambda = 1064$ nm, can be made to calculate progressive reductions in the index of refraction of such film, during irradiation, as discussed more fully in Example II below.

Thus it has been found that the refractive index of PS-MR film, $n_f$ (of the composition described with respect to FIG. 5 above), when photobleached, e.g. at between 400 to 600 nm, (such $n_f$) is reduced from 1.633 to 1.610 for a drop in $n_f$ of 0.020.

In addition to defining optical channels by boundary photobleaching of such film, the invention provides other optical components, including a grating that does not require a physical reshaping, e.g. ion milling of film or substrate. That is, the method of the invention provides for photobleaching of a coupling grating in such film, herein denoted a phase grating.

Figure 6:
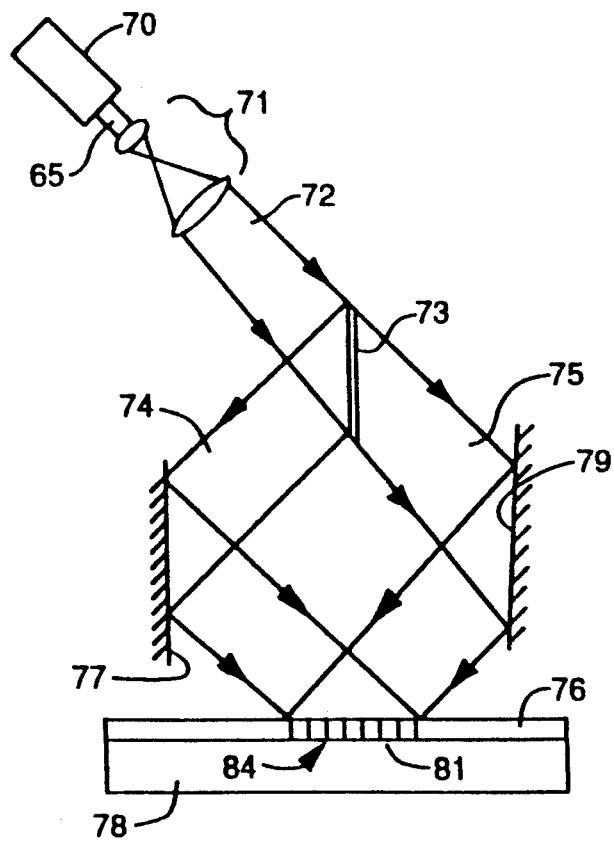
FIG. 6 is a schematic sectional elevation view of another method embodying the present invention.

Thus laser diode 70 directs laser beam 65 through a lens combination 71 to produce a collimated light beam 72. The collimated beam 72 is split into two separate beams of equal intensity 74 and 75 by an optical beam splitter 73. Two mirrors 77 and 79 redirect the light beams to optically interfere at a spot 81 on PS-MR film 76 which has been deposited onto a glass substrate 78. The relative angle of the interfering beams is adjusted in order to define the periodicity of the constructive and destructive interference zones, which provide a phase grating of modulated refractive index 84, as shown in FIG. 6.

Figure 7:
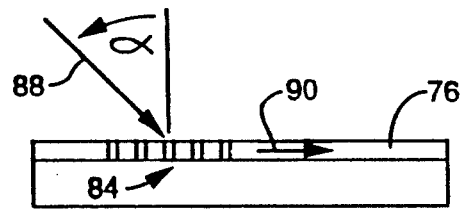
FIG. 7 is a schematic sectional elevation view of another optical component embodying the present invention and FIG. 8 is a perspective view of an integrated optic product embodying the present invention.

Thus a light beam 88, incoming at a suitable incident angle $\alpha$, is coupled by the phase grating 84 into a waveguide in the film, as indicated by the arrow 90, shown in FIG. 7.

However, the phase grating embodying the invention does not change its coupling angle by photobleaching in the manner described above with respect to FIGS. 3 and 4, since such photobleaching is detrimental to the phase grating of the invention, itself formed by photobleaching of two interfering beams, as noted above.

Figure 8:
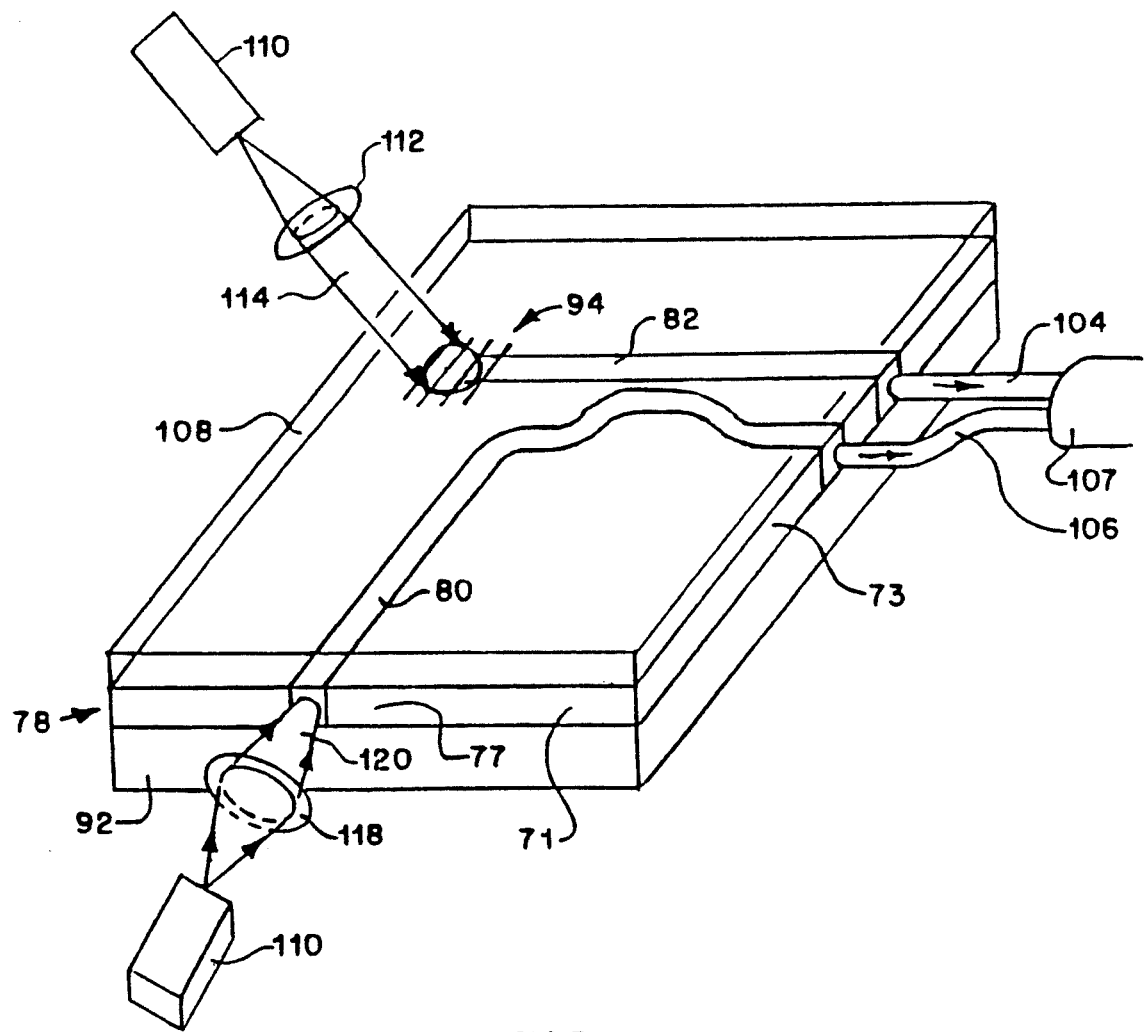

An integrated optical circuit according to the invention, is shown in FIG. 8, wherein PS-MR film 71 is mounted on glass substrate 92 and has lesser or unbleached waveguides 80 and 82, defined in such film 71. A phase grating 94 in the film 71 optically connects with the waveguide 82, as shown in FIG. 8. Preferably the phase grating 94 is fabricated in the film 71, e.g. in the manner shown in FIG. 6, before the waveguides 80 and 82, which are then fabricated, e.g. per the method shown in FIG. 2.

Also an optical fiber 104 connects with waveguide 82 and an optical fiber 106 connects with waveguide 80 at the film edge 73, as shown in FIG. 8. For refractive index durability, the integrated optic circuit 78 is encapsulated with an epoxy layer 108, which has a refractive index below that of the lesser or unbleached waveguides 80 and 82 as does the glass substrate 92, so that such waveguides are enclosed on all sides by reflective interfaces of lower indices of refraction, as indicated in FIG. 8.

In operation, a laser diode 110 directs through a lens 112 a laser beam 114 into the phase grating 94 to couple into the waveguide 82 and thence to the optic fiber 104, as shown in FIG. 8. Concurrently or separately, laser diode 116 directs through lens 118, laser beam 120 into waveguide 80, at the edge of the film 77 and thence to optic fiber 106, as shown in FIG. 8.

Accordingly, the methods of the present invention provide for fabricating an integrated optical circuit of considerable compactness and versatility.

Thus the invention provides methods to produce integrated optical components including waveguides and phase gratings by irradiating PS-AD films, directly, with or without masks through photolithographic processing. The photobleaching process renders transparent such films and induces reduction in the refractive index thereof as noted above. After exposure the photobleached product can be stabilized by encapsulating the material as noted above.

The following examples are intended to illustrate the invention and should not be construed in limitation thereof.

EXAMPLE I

PS-MR was obtained commercially. Methyl red and polystyrene (28.5 wt. % MR & 71.5 wt % PS) were dissolved at 10% by wt. into chlorobenzene by standing, e.g., 6 to 10 hours at e.g. 20° C. The molecular weight of the polystyrene was 20,000. The solution was spin-coated onto fused silica substrates at 1000 to 2000 RPM, for 60 seconds to form thin films thereon. The thin film thicknesses measured 0.5 to 1.5 um thick. The film samples were allowed to sit overnight (8 to 10 hours) to facilitate the evaporation of excess solvent.

The spin-coated PS-MR samples were exposed to a collimated beam from a UV lamp (at a power density of 16 mW/cm$^2$ for 3 hours. Absorption spectra of the above film for various exposure energies are displayed in FIG. 5. This Figure shows that the absorption band in the range of 400 to 600 nm, is reduced after irradiating such film samples for the 3 hour period.

The refractive index of the bleached sample was found to be reduced by 0.02 from the refractive index of the unbleached PS-MR film as more fully discussed in Example II below.

When a mask was placed in close contact over the film in the path of the UV beam, e.g. as shown in FIG. 2, the observed transition boundaries between bleached and unbleached regions of the film were sharp.

EXAMPLE II

A 365 nm period grating was ion-milled into fused silica substrate slides through a photoresist mask to form relief gratings. The 10% by weight solution of PS-MR/chlorobenzene was spin-coated onto such slides, as described in Example I, above and allowed to sit until the excess solvent evaporated (8 to 10 hours), to provide solution cast film on such relief grating slides such as shown in FIG. 3 hereof. Again the films were 0.5 to 1.5 um thick.

Coupling angles were measured using a computer-controlled rotation stage and were obtained for three TE polarized waveguide modes at 0.6328 um or 632.8 nm. The three coupling angles were used to measure the film thickness and refractive index of the PS-MR film both before and after photobleaching thereof.

The coupling spot on the film above the grating was irradiated with a focused laser beam at 514.5 nm in the manner shown in FIG. 4 hereof.

Before bleaching, the refractive index of such grating samples were found to be 1.633 (measured at $\lambda=0.6328$ um). After irradiating the coupling spot as described above, the refractive index of such film (due to a change in incident angle, as discussed above with respect to FIG. 4) was found to be 1.610 so that a change in refractive index of 0.02 was obtained. Such change (in $n_f$) is sufficient to write channels and phase gratings in films of PS-MR in the manner shown in FIGS. 2 and 6 hereof. As indicated above, the channels are written by irradiating and photobleaching films of PS-MR with portions thereof being masked to provide unbleached channels or waveguides, as discussed above. The phase gratings are formed by directing interfering laser beams to a coupling spot on such film, as previously discussed.

EXAMPLE III

A phase grating with period λ=1.7 um is formed in spin-coated PS-MR thin film. This is done by directing a pair of interfering argon laser beams at a coupling spot on the film, each at an opposite angle of 19 degrees with the film surface, at λ=514.5 nm, with an intensity of 30 mW for 300 seconds. Thus by the method shown, e.g. in FIG. 6, a phase grating is quickly and readily inscribed in such film.

Thereafter, a channel or waveguide connecting with such grating is formed in the PS-MR film by covering a portion thereof connecting with such grating, with a metalized mask and exposing the film with an ultraviolet source (HTG LS-60 UV light source system), for 15 minutes at about 20 W/cm$^2$ in the manner indicated in FIG. 2.

Thus, in the manner shown in FIG. 6, a phase grating is readily and quickly inscribed in such polymer film, followed by installation of a connecting waveguide (e.g. per FIG. 2) to quickly provide integrated optical components per the method of the present invention.

As noted above, the invention provides for photobleaching PS-AD film to provide integrated optics at low cost.

Such films are preferably deposited on transparent substrates such as glass. Such films can be irradiated per the method of the invention by laser beam, white light or UV light depending upon the application thereof. Of course gratings are formed in such film by interfering two laser beams at a coupling spot on the film, as discussed above.

The benefit of the photobleaching of such film is that it lowers the refractive index of such film on both sides of the unbleached channel so as to keep an applied or coupled light beam in such channel by reflectance at the interfaces thereof. And gratings are added to such integrated circuit as discussed above.

Figure 5:
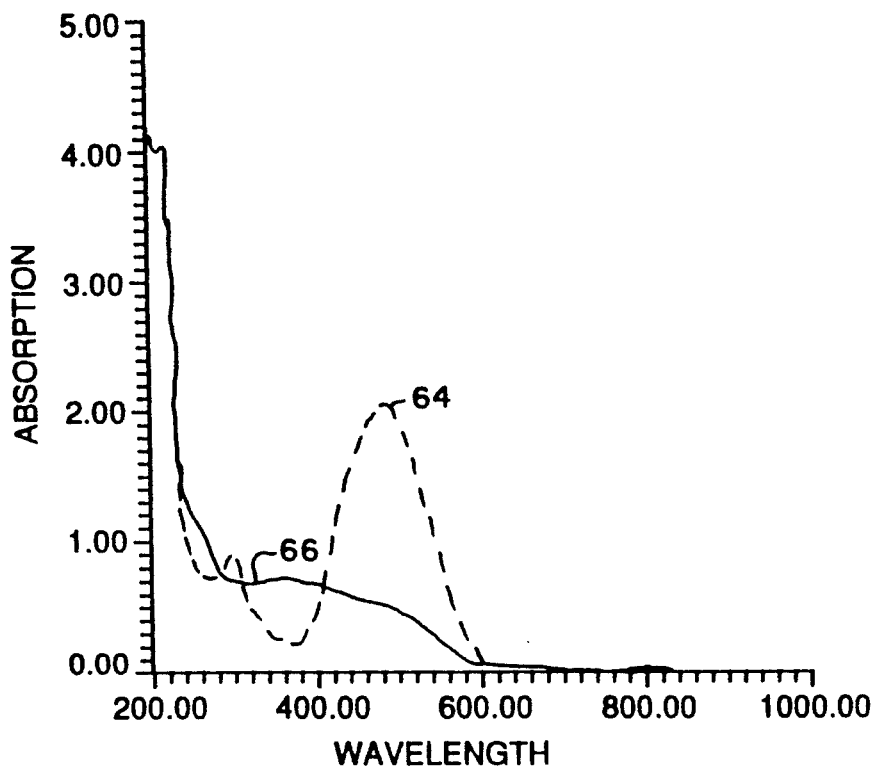
FIG. 5 is a graph illustrating certain examples of the method and article of the present invention.

Per the graph of FIG. 5, such unbleached channels will accept and not absorb wavelengths greater than 600 nm which render such integrated optics, including phase gratings, waveguides and optical interconnects, highly suitable for communication wavelengths, which are within the range of, e.g. 1300 to 1500 nm.

As noted above, various lights can be employed to bleach such film provided it be tuned within the absorption band of such film. Thus, looking at FIG. 5, it can be seen that a UV beam, including λs of 405 to 440 nm or more has suitable wavelengths to bleach such film.

Of course as the channels are lesser or unbleached portions of the film, the light transmitted therein must be of a wavelength greater than 600 nm to render such channels transparent thereto, as discussed above.

Thus photo-induced bleaching can occur by exposing spin-coated PS-MR films in open air, to light tuned to within the adsorption band of the polymer. This effect is believed caused by oxidation of the PS-MR film. This effect can be quite useful because refractive index changes of 0.020 (or more) allow integrated optic components and circuits to be formed directly, by proper exposure of such polymer film. The novel methods of the invention also provide novel products, ie. the integrated optics including the components thereof, such as phase gratings and optical channels or waveguides. Encapsulating the exposed film after removal of residual gas therein, stabilizes the integrated optical products from further bleaching.

Thus the methods of the invention can lead to low cost, low temperature, single step fabrication of integrated optical patterns for integrated optics, optical interconnects, non linear, integrated optics and passive linear, integrated, optical circuits. In addition there are applications in the area of low-cost polymer, read-write heads for optical data storage.

What is claimed is:

1. An integrated optic comprising a film of polystyrene doped with methyl red on a substrate, which film has at least two spaced photobleached portions with a lesser bleached or unbleached part therebetween, said photobleached portions having a lesser index of refraction than said part to provide reflective boundaries thereat to define an optical component in said part.

2. The optic of claim 1 having photobleached portions on at least two sides of a lesser or unbleached part so that said part defines a waveguide in said film.

3. The optic of claim 1 having a phase grating photobleached therein.

4. The optic of claim 3 having a lesser or unbleached part or pathway extending to said phase grating to define a waveguide or channel which optically communicates with said phase grating.

5. The optic of claim 3 wherein said film is 0.5 to 1.5 um thick.

6. The optic of claim 1 wherein said film is less than 1 um thick.

7. The optic of claim 1 wherein said film has a pattern of lesser or unbleached parts or optic components therein.

8. The optic of claim 1 wherein said film is deposited on a glass substrate.

9. The optic of claim 8 wherein said film is photobleached or photolithographed in a pattern for integrated optical application.

10. The optic of claim 1 wherein the index of refraction of a film of polystyrene doped with methyl red is reduced by up to 0.020 for a λ of 1064 nm.

11. The optic of claim 1 wherein the so-bleached film is covered by a layer of lesser index of refraction than each lesser or unbleached film part so that said layer and said substrate form reflective boundaries for optic components in said film.

12. The optic of claim 1 wherein said film is photobleached around lesser or unbleached portions which define optical components including optical interconnects, waveguides and phase gratings as well as polymer read-write heads for optical data storage.

13. The optic of claim 12 encapsulated by an epoxy of lesser refractive index than said components for refractive index durability.

14. An integrated optic comprising, a film of polystyrene doped with an azo dye which has been photobleached to reduce the refractive index thereof in a pattern, the bleached portion having a lesser index of refraction than the lesser bleached or unbleached part to define an optical component with said part.

* * * * *